US008812454B2

(12) United States Patent
Puttaswamy Naga et al.

(10) Patent No.: US 8,812,454 B2
(45) Date of Patent: Aug. 19, 2014

(54) APPARATUS AND METHOD FOR MANAGING STORAGE OF DATA BLOCKS

(75) Inventors: Krishna P. Puttaswamy Naga, Metucken, NJ (US); Thyagarajan Nandagopal, Edison, NJ (US); Muralidharan S. Kodialam, Marlboro, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 393 days.

(21) Appl. No.: 13/348,754

(22) Filed: Jan. 12, 2012

(65) Prior Publication Data
US 2013/0185229 A1 Jul. 18, 2013

(51) Int. Cl.
G06F 7/00 (2006.01)
G06F 17/00 (2006.01)
G06F 12/00 (2006.01)

(52) U.S. Cl.
USPC ........... 707/661; 707/662; 707/663; 707/665; 707/668; 711/161; 711/162; 711/166

(58) Field of Classification Search
USPC ......... 707/609, 604, 661, 662, 663, 665, 668, 707/827; 711/100, 154, 161, 162
See application file for complete search history.

(56) References Cited

U.S. PATENT DOCUMENTS

| 6,745,304 | B2 | 6/2004 | Playe |
| 7,971,001 | B2 * | 6/2011 | Petev et al. .................... 711/136 |
| 2013/0238572 | A1 * | 9/2013 | Prahlad et al. ................ 707/692 |

OTHER PUBLICATIONS

Wheeler, Jim "Data Lifecycle Management: Hard Drives are not Enough." Feb. 2005, Computer Technology Review, vol. 25, Issue 2, pp. 34-35.*
Liu, W. "Using locality and interleaving information to improve shared cache performance." 2009, (Order No. 3359458, University of Maryland, College Park). ProQuest Dissertations and Theses, Retrieved from http://search.proquest.com/docview/304923132?accountid=14753. (304923132).*
M. Bhadkamkar, J. Guerra, L. Useche, S. Burnett, J. Liptak, R. Rangaswami, and V. Hristidis, "BORG: Block-ReORGanization for Self-Optimizing Storage Systems," Proceedings of the 7th Conference on File and Storage Technologies (FAST) 2009.
N. Megiddo and D. Modha, "ARC: A Self-Tuning, Low Overhead Replacement Cache," Proc. of FAST, 2003.
J. Wilkes, R. Golding, C. Staelin, and T. Sullivan, "The HP Autoraid Hierarchical Storage System," ACM Transactions on Computer Systems, Feb. 14, 1996.
Brocade Communications Systems, Inc, "Brocade File Lifecycle Manager (FLM) 4.0 Administration Guide," May 29, 2007.

(Continued)

Primary Examiner — Michael Harrington
(74) Attorney, Agent, or Firm — Wall & Tong

(57) ABSTRACT

A data block storage management capability is presented. A cloud file system management capability manages storage of data blocks of a file system across multiple cloud storage services (e.g., including determining, for each data block to be stored, a storage location and a storage duration for the data block). A cloud file system management capability manages movement of data blocks of a file system between storage volumes of cloud storage services. A cloud file system management capability provides a probabilistic eviction scheme for evicting data blocks from storage volumes of cloud storage services in advance of storage deadlines by which the data blocks are to be removed from the storage volumes. A cloud file system management capability enables dynamic adaptation of the storage volume sizes of the storage volumes of the cloud storage services.

21 Claims, 7 Drawing Sheets

(56) References Cited

OTHER PUBLICATIONS

Google, "S3 Backer, FUSE-Based Single File Backing Store Via Amazon S3," http://code.google.com/p/s3backer/wiki/ChoosingBlockSize, printed Jan. 10, 2012.
Wikipedia, "Hierarchical Storage Management," http://en.wikipedia.org/wiki/Hierarchical storage management, printed Jan. 10, 2012.
D. Isaac, "Hierarchical Storage Management for Relational Databases," 12th IEEE Symposium on Mass Storage Systems, 1993.
S.-H. Gary Chan and F. A. Tobagi, "Modeling and Dimensioning Hierarchical Storage Systems for Low-Delay Video Services," IEEE Transactions on Computers, vol. 52, No. 7, Jul. 2003.
Amazon, "Elasticache," http://aws.amazon.com/elasticache/, printed Jan. 10, 2012.
Amazon, "Amazon Simple Storage Service FAQS," http://aws.amazon.com/s3/faqs/, printed Jan. 10, 2012.
Amazon, "EBS to S3 Snapshot Block Size," https://forums.aws.amazon.com/message.jspa?messageID=142082, printed Jan. 10, 2012.
Microsoft, "Windows Azure Caching Service," http://msdn.microsoft.com/enus/library/windowsazure/gg278356.aspx, printed Jan. 10, 2012.
Amazon, "Amazon Elastic Block Store (EBS)," http://aws.amazon.com/ebs/, printed Jan. 10, 2012.
A. Karlin, M. Manasse, L. McGeoch, and S. Owicki., "Competitive Randomized Algorithms for Non-Uniform Problems," Proc. of SODA 1990.
A. W. Leung, S. Pasupathy, G. Goodson, and E. L. Miller, "Measurement and Analysis of Large-Scale Network File System Workloads," Proc. of the USENIX ATC, Boston, MA, 2008.
D. Narayanan, A. Donnelly, and A. Rowstron, "Write Offloading: Practical Power Management for Enterprise Storage," Proc. of FAST, 2008.

* cited by examiner

Pseudocode 1 PFS_Read (Disk, Cache)

```
1:  function Initialize()
2:  Cache size, S=1 GB; B_replace = B_evict = 0; T ← f_d / m_c
3:
4:  function Access_Block(Block A) { // Every block read}
5:    t ← current time
6:    if A ∈ Cache then
7:      Serve_Access_Request (A)
8:    else { A ∉ Cache}
9:      fetch A from Disc
10:     if Cache is full then
11:       R ← FindReplacementBlock
12:       evict R from Cache
13:       if evictionTime(R) > t then
14:         B_replace = B_replace + block size
15:       end if
16:     end if
17:     Load A into Cache
18:   end if
19:   evictionTime(A) ← t + Compute_Eviction_Time()
20:
21: function Volume_Resize(Cache) {// Periodic}
22:   t ← current time
23:   I ← All blocks in Cache with evictionTime ≤ t
24:   evict all blocks in I
25:   B_evict = B_evict + |I| * block size
26:   S = S + ⌊(B_replace - B_evict) / G⌋ * G
27:   B_replace = B_evict = 0
28:
29: function Compute_Eviction_Time()
30:   r ← Random[0:1]
31:   return T log[(e - 1)r + 1]
```

APPARATUS AND METHOD FOR MANAGING STORAGE OF DATA BLOCKS

TECHNICAL FIELD

The invention relates generally to storage of data blocks and, more specifically but not exclusively, to storage of data blocks of cloud file systems.

BACKGROUND

Data center based cloud services are rapidly becoming the choice of enterprises to host their data, including hosting of mission-critical services such as application data and file systems. Additionally, many enterprises are moving their internal IT services to the cloud, in order to reduce their IT capital expenses as well as reduce associated network management overhead. While enterprise data can be stored in several forms, it is typically stored in the form of a collection of files known as a file system. In many cases, cost is the primary driver behind the migration of enterprise data into the cloud, as storage services providers in the cloud allow users to expand/contract their storage outlay on a dynamic basis at various granularities of data storage capacity and storage time. Disadvantageously, however, with different storage service providers offering an array of storage services having differing technical specifications and pricing options, it is often difficult to determine the type of storage service that is suitable for a file system.

SUMMARY

Various deficiencies in the prior art are addressed by embodiments for managing storage of data blocks.

In one embodiment, an apparatus includes a processor and a memory. The processor is configured to determine a storage location and a storage duration for a data block using cost information associated with a plurality of cloud storage services available for storing data blocks of a file system. The storage location specifies one of the cloud storage services in which the data block is to be stored. The storage duration specifies a length of time for which the data block is to be stored in the storage location. The processor also is configured to analyze storage of the data block at the storage location, based on an access pattern of the data block and the storage duration determined for the data block, to determine whether to remove the data block from the storage location.

In one embodiment, a method includes using a processor and a memory for determining a storage location and a storage duration for a data block and analyzing storage of the data block at the storage location for determining whether to remove the data block from the storage location. The storage location and storage duration are determined using cost information associated with a plurality of cloud storage services available for storing data blocks of a file system. The storage location specifies one of the cloud storage services in which the data block is to be stored. The storage duration specifies a length of time for which the data block is to be stored in the storage location. The storage of the data block at the storage location is analyzed based on an access pattern of the data block and the storage duration determined for the data block.

In one embodiment, an apparatus includes a processor configured to determine a storage duration for storage of a data block in a memory, compute a data block eviction time for the data block based on a probability density function, and evict the data block from the memory when the block eviction time elapses without a subsequence access to the data block. The storage duration is configured to indicate a time at which the data block is scheduled to be removed from the memory. The probability density function is configured to describe a probability of removing the data block from the memory at a time, within a range of time from an initial time to the time at which the data block is scheduled to be removed from the memory, since a last access time of the data block.

In one embodiment, a method includes using a processor for determining a storage duration for storage of a data block in a memory, computing a data block eviction time for the data block based on a probability density function, and evicting the data block from the memory when the block eviction time elapses without a subsequence access to the data block. The storage duration is configured to indicate a time at which the data block is scheduled to be removed from the memory. The probability density function is configured to describe a probability of removing the data block from the memory at a time, within a range of time from an initial time to the time at which the data block is scheduled to be removed from the memory, since a last access time of the data block.

BRIEF DESCRIPTION OF THE DRAWINGS

The teachings herein can be readily understood by considering the following detailed description in conjunction with the accompanying drawings, in which:

FIG. 3 depicts exemplary pseudocode for a read operation in the duel-service cloud storage model of FIG. 2;

To facilitate understanding, identical reference numerals have been used, where possible, to designate identical elements that are common to the figures.

DETAILED DESCRIPTION

Figure 1:
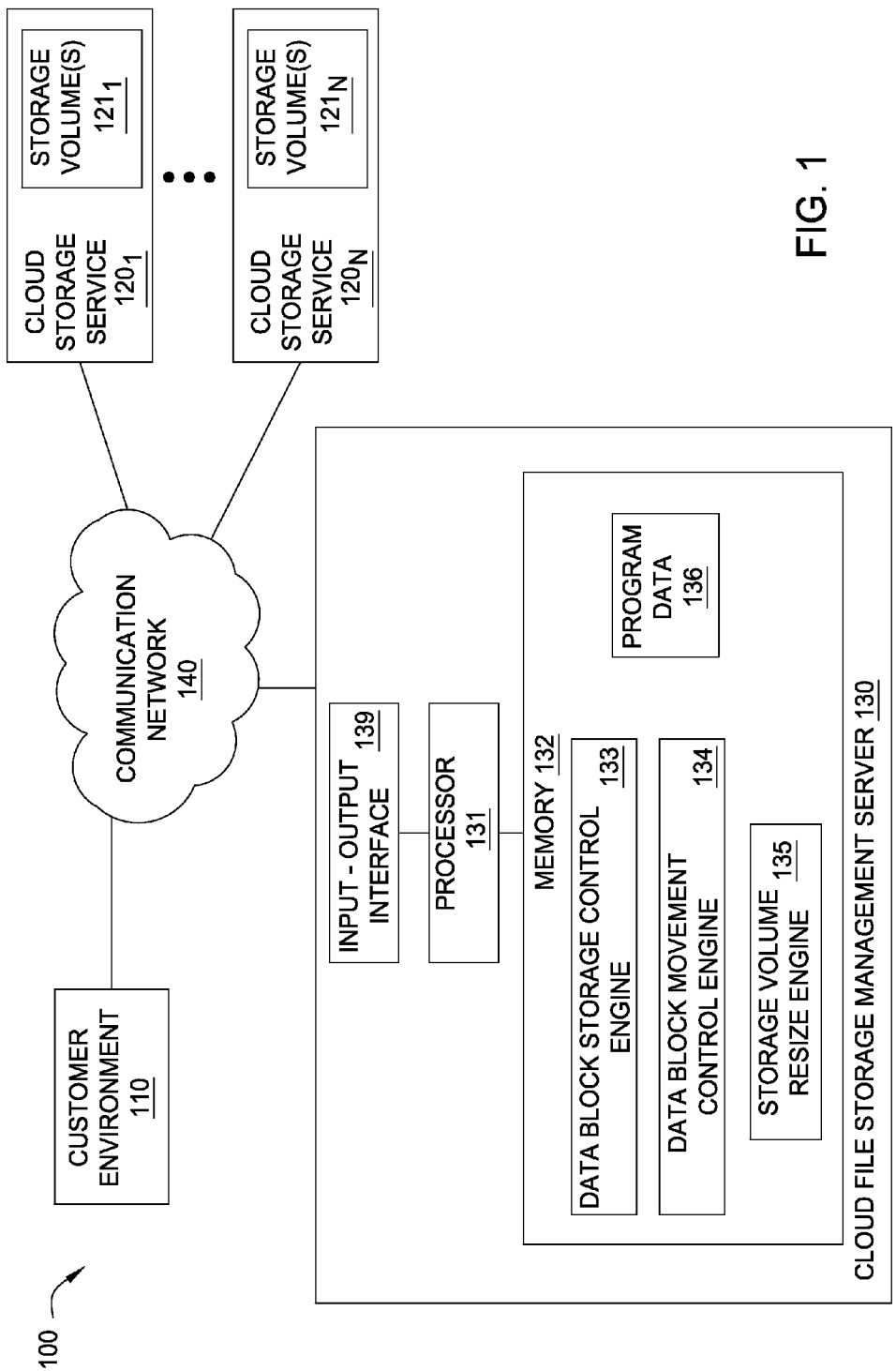
FIG. 1 depicts a high-level block diagram of an exemplary system including a plurality of cloud storage services and a server configured to support management of cloud-based storage of data blocks of a file system using the cloud storage services.

In general, a data block storage management capability is depicted and described herein, although various other capabilities also may be presented herein. In one embodiment, a cloud file system management capability is provided for managing storage of data blocks of a cloud file system. In one embodiment, a data block storage capability is provided for managing storage of data blocks in memory, which may include memory used to host a cloud file system or any other suitable memory. Various other related capabilities also may be provided.

In at least some embodiments, a cloud file system management capability significantly reduces the cost of operating a file system in the cloud within provable performance bounds.

In at least some embodiments, a cloud file system management capability reduces (and, in at least some cases, minimizes) the cost of storing and accessing data in the cloud by effectively utilizing and integrating the various choices of cloud storage services (e.g., of a single cloud service provider, across multiple cloud service providers, and the like, as well as various combinations thereof).

In at least some embodiments, a cloud file system management capability manages storage of data blocks of a file system across multiple cloud storage services (e.g., including determining, for each data block to be stored, a storage location for the data block and a storage duration for the data block).

In at least some embodiments, a cloud file system management capability manages movement of data blocks of a file system between storage volumes of cloud storage services. In at least some embodiments, the cloud file system management capability manages movement of data blocks based on various costs associated with the cloud storage services (e.g., storage costs, access costs, and the like). In at least some embodiments, the cloud file system management capability manages removal of data blocks from memory based on analysis of access patterns of the data blocks stored in the cloud storage services and the storage durations of the data blocks stored in the cloud storage services. In at least some embodiments, the cloud file system management capability provides a probabilistic eviction scheme for evicting data blocks from storage volumes of cloud storage services in advance of storage deadlines by which the data blocks are to be removed from the storage volumes. In at least some such embodiments, the probabilistic eviction scheme automatically adapts to requirements of the file system, independent of access patterns, in order to determine the most cost effective way of serving demands for data blocks of the file system.

In at least some embodiments, a cloud file system management capability enables dynamic adaptation of the storage volume sizes of the storage volumes of the cloud storage services.

It is noted that various cloud file system management capability embodiments may enable significant reductions in file storage and access costs of current cloud systems (e.g., by a factor of two or more), while allowing customers to utilize the benefits of the various cloud storage services.

In at least some embodiments, a data block storage capability enables eviction of a data block from a memory at a data block eviction time which is before a time at which the data block is scheduled to be removed from the memory. The data block eviction time may be determined using a probability density function that is configured to describe a probability of removing the data block from the memory at a time, within a range of time from an initial time to a time at which the data block is scheduled to be removed from the memory, since a last access time of the data block.

These and various other embodiments may be better understood in view of FIGS. 1-6 depicted and described herein.

FIG. 1 depicts a high-level block diagram of an exemplary system including a plurality of cloud storage services and a server configured to support management of cloud-based storage of data blocks of a file system using the cloud storage services.

As depicted in FIG. 1, system 100 includes a customer environment 110, a plurality of cloud storage services $120_1$-$120_N$ (collectively, cloud storage services 120), a cloud file storage management server 130, and a communication network 140.

The customer environment 110 is an environment of a customer which has a file system 111 that the customer would like to maintain in the cloud. For example, the customer may be an enterprise customer, a business customer, an individual customer, and the like. The customer environment 110 may include various elements (e.g., one or more user terminals via which a user or users may use cloud services of cloud storage services 120, telecommunication equipment, and the like, as well as various combinations thereof), depending on the type and size of the customer. The customer environment 110 includes one or more devices configured to access communication network 140 (omitted for purposes of clarity). The file system 111 includes a plurality of files, each composed of one or more data blocks. The data blocks of file system 111 are maintained within the cloud using two or more of the cloud storage services 120. The data blocks of file system 111, once stored within the cloud using two or more of the cloud storage services 120, may be accessed by users from customer environment 110 in any suitable manner.

The cloud storage services 120 each are configured to provide cloud-based storage of data for customers (illustratively, cloud-based storage of the file system 111 of the customer of customer environment 110). The cloud storage services $120_1$-$120_N$ each support cloud-based storage of the file system 111 using one or more storage volumes $121_1$-$121_N$ (collectively, storage volumes 121), respectively. The storage volume(s) 121 of a cloud storage service 120 are allocated for the customer of customer environment 110 for use in storing files of the file system 111. The data blocks of the file system 111 are stored in the storage volumes 121 of cloud storage services 120, and moved between storage volumes 121 of cloud storage services 120, as specified by cloud file storage management server 130. The storage volumes 121 of the cloud storage services 120 have storage volume sizes associated therewith, which may be dynamically increased and decreased by cloud file storage management server 130. Although omitted for purposes of clarity, it will be appreciated that each of the cloud storage services 120 is supported using various types of equipment which may be deployed in data centers of cloud service providers (e.g., networking devices, aggregator switches, racks, top-of-rack switches, hypervisors, blade servers, blades, processors, and the like, as well as various combinations thereof).

The cloud storage services 120 have differing system characteristics associated therewith. For example, cloud storage services 120 may have one or more of differing technical specifications, differing pricing/cost models, and the like, as well as various combinations thereof.

The pricing/cost models of cloud storage services 120 may specify one or more pricing/cost options. In one embodiment, for example, pricing/cost models of cloud storage services 120 may specify pricing options such as storage pricing/cost (e.g., X amount of storage capacity allocated for T length of time), access pricing/cost (e.g., X number of I/O requests with GET and PUT requests having different prices/costs associated therewith), bandwidth pricing/cost (e.g., per X amount of data incoming and/or per X amount of data outgoing), and the like, as well as various combinations thereof). The pricing/cost models may include fixed pricing/cost models (e.g., where prices/costs remain fixed over relatively long periods of time) and/or dynamic pricing/cost models (e.g., where prices/costs change dynamically over time (even, in some cases, over relatively short periods of time), such as in spot pricing of storage resources and/or other types of resources). In at least some of the cloud storage services 120, the pricing/cost models of the cloud storage services 120 enable the cloud resources of the cloud storage services 120 to be purchased on a granular basis on fine time scales (e.g., storage resources in terms of GB per hour, storage accesses in terms of a million accesses per day, and the like). In analyzing such pricing/cost models, it will be appreciated that different cloud storage services 120 may support various combinations of such pricing/cost options related to the underlying technical capabilities providing for such pricing/cost options. For example, cloud storage service $120_1$ may provide relatively low-cost storage while charging a relatively high cost for data accesses. Similarly, for example, cloud storage service $120_2$ may provide relatively high-cost storage while charging a relatively low cost for data accesses. It is noted that such pricing models may vary across cloud service providers, and even within specific cloud service providers. As a result of these varying pricing/cost policies of the cloud storage services 120, some cloud storage services 120 may be preferred over other cloud storage services 120 depending on various characteristics of the file system to be stored in the cloud (e.g., size of file system, types of files, sizes of files, sizes of data blocks of which the files are composed, access frequency of files, access frequency of data blocks of which the files are composed, and the like, as well as various combinations thereof).

The cloud storage services 120 may be services provided by one or more cloud service providers. For example, cloud storage services $120_1$-$120_N$ all may be varying cloud storage services of AMAZON (e.g., AMAZON S3, AMAZON EBS, AMAZON ELASTICACHE, and the like). For example, cloud storage services $120_1$-$120_3$ may be varying cloud storage services of AMAZON while cloud storage services $120_4$-$120_N$ may be varying cloud storage services of MICROSOFT (e.g., MICROSOFT AZURECACHE and the like). In this manner, the customer of customer environment 110 may be provided flexibility to store files of its file system 111 across varying cloud storage services of one cloud service provider, or even across varying cloud storage services of multiple cloud service providers. The technical specifications and pricing models of these and other cloud storage services will be understood by one skilled in the art.

The cloud file storage management server 130 is configured to provide various functions of the cloud file system management capability.

The cloud file storage management server 130 is configured to select which combination of cloud storage services 120 is to be used to maintain the file system 111 in the cloud. The selection of which combination of cloud storage services 120 is to be used to maintain the file system 111 in the cloud, and the manner in which the cloud storage services 120 are used to maintain the file system 111 in the cloud, may depend on factors such as pricing (e.g., storage, access, and/or bandwidth costs for different cloud storage services 120), access patterns of the file system 111, and the like. For example, depending on the costs associated with cloud storage services 120 and the nature of the access patterns of the file system 111 at any given time, different sets of cloud storage services 120 might be optimal for hosting data blocks of the files of the file system 111 at any given time. For example, a first of the cloud storage services 120 (having relatively low memory costs and relatively high access costs) may be selected for a portion of the file system 111 having a relatively low workload with few I/O accesses, whereas a second of the cloud storage services 120 (having relatively high memory costs and relatively low access costs) may be selected for a portion of the file system 111 having a relatively high workload with many I/O accesses. Within a given file system (e.g., file system 111), the access patterns of the file system might exhibit these different characteristics at various points over a large period of time.

The cloud file storage management server 130 is configured to use multiple cloud storage services 120 to provide cloud-based storage of the file system 111 of the customer of customer environment 110. The cloud file storage management server 130 is configured to determine initial storage of data blocks of the file system 111 (e.g., storage locations and storage durations for data blocks of the file system 111) based on analysis of cost information associated with the cloud storage services 120. The cloud file storage management server 130 is configured to manage use of cloud storage services 120 to store the data blocks of the file system 111 based on analysis of cost information associated with the cloud storage services 120 and analysis of the access patterns of the data blocks of the file system 111. The cloud file storage management server 130 is configured to determine movement of data blocks of file system 111 between storage volumes 121 of cloud storage services 120 dynamically (e.g., based on one or more of analysis of access patterns of the data blocks of file system 111 that are stored in the storage volumes 121 of the cloud storage services 120, costs associated with the cloud storage services 120 (e.g., storage costs, I/O costs, bandwidth costs, and the like), and the like, as well as various combinations thereof.

The cloud file storage management server 130 enables the file system 111 to span multiple cloud storage services 120 while supporting dynamic movement of data blocks of the file system 111 between multiple cloud storage services 120 and, in at least some cases, also supporting dynamic increasing/decreasing of the storage volume sizes of the storage volumes 121 of the cloud storage services 120 used for storing data blocks of the file system 111, thereby reducing (and, in at least some cases, minimizing) cumulative storage and access costs for the file system 111.

The cloud file storage management system 130 may be implemented in any suitable manner.

The cloud file storage management system 130 includes a processor 131, a memory 132, and an input-output interface 139. The processor 131 is coupled to both memory 132 and input-output interface 139.

The processor 131 is configured to access memory 132 for retrieving various engines and associated program data and executing the various engines using the associated program data to perform various functions depicted and described herein.

The memory 132 stores a data block storage control engine 133, a data block movement control engine 134, and a storage volume resize engine 135. The memory 132 also stores program data 136 for use by one or more of data block storage control engine 133, data block storage movement engine 134, and/or storage volume resize engine 135 in performing various functions depicted and described herein.

The input-output interface 139 provides an interface via which cloud file storage management system 130 may interface with communication network 140 and, thus, may communicate with customer environment 110 and cloud storage services 120.

The cloud file storage management server 130, using one or more of the data block storage control engine 133, the data block movement control engine 134, and the storage volume resize engine 135, is configured to provide various functions of the cloud file system management capability.

In one embodiment, data block storage control engine 133 is configured to compute, for each data block of the file system 111, a storage location for the data block and a storage duration for which the data block is to be stored at the storage location. The data block storage control engine 133 may determine the storage location and storage duration for a data block using cost information associated with the cloud storage services 120 available for use in storing the file system 111. For example, the cost information may include fixed cost information (e.g., based on fixed pricing models of the cloud storage services 120) and/or dynamic cost information (e.g., based on spot pricing offers of the cloud storage services 120 and/or any other suitable type(s) of dynamic pricing information). For example, the cost information associated with a cloud storage service 120 may include one or more of storage costs, I/O costs, bandwidth costs, and the like, as well as various combinations thereof. The storage location of a data block as computed by data block storage control engine 133 may be specified at any suitable granularity (e.g., specifying which of the cloud storage services 120 is to be used to store the data block, specifying a specific portion of the storage volume 121 of one of the cloud storage services 120 that is to be used to store the data block, and the like). The storage duration of a data block as computed by data block storage control engine 133 may be specified at any suitable time scale (e.g., per minute, per hour, and the like). The storage duration for a data block may be used to determine an associated storage deadline which indicates a time at which the data block is scheduled to be removed from the storage location. The storage deadline for a data block may be computed from the storage duration of the data block in any suitable manner (e.g., current time plus the storage duration). These and various other embodiments supported by data block storage control engine 133 may be better understood by considering the exemplary dual-service cloud storage model of FIG. 2.

In one embodiment, data block movement control engine 134 is configured to analyze the access patterns of the data blocks of the file system 111 as stored in the cloud storage services 120 and control movement of data blocks of the file system 111 between storage volumes 121 of cloud storage services 120 based on the access patterns. The data block movement control engine 134 may be configured to determine movement of data blocks of the file system 111 between storage volumes 121 of cloud storage services 120 based on storage deadlines associated with the storage durations of the data blocks as computed by data block movement control engine 133. The data block movement control engine 134 also may be configured to determine movement of data blocks of the file system 111 between storage volumes 121 of cloud storage services 120 ahead of the data block storage deadlines associated with the storage durations of the data blocks (e.g., using one or more storage volume replacement techniques, such as Least Recently Used (LRU), Adaptive Replacement Cache (ARC), and the like). The data block movement control engine 134 may analyze the access patterns of the file system 111 in any suitable manner (e.g., such as by monitoring and tracking data block access patterns associated with data blocks of the file system 111). These and various other embodiments supported by data block movement control engine 134 may be better understood by considering the exemplary dual-service cloud storage model of FIG. 2.

In one embodiment, storage volume resize engine 135 is configured to determine when and how to adjust the storage volume sizes of the storage volumes 121 of cloud storage services 120. The storage volume resize engine 135 may be configured to adjust the storage volume sizes of storage volumes 121 using input information received from the data block storage control engine 133 and/or the data block movement control engine 134. The storage volume resize engine 135 may be configured to adjust the storage volume sizes of the storage volumes 121 at different time instants in a way that minimizes overall cost of operation of the file system 111 in the cloud. These and various other embodiments supported by storage volume resize engine 135 may be better understood by considering the exemplary dual-service cloud storage model of FIG. 2.

Although the cloud file storage management server 130 is primarily depicted and described herein as a standalone element accessible via communication network 140, it is noted that cloud file storage management server 130 may be deployed in various other locations. In one embodiment, for example, cloud file storage management server 130 may be deployed within the customer environment 110. In one embodiment, for example, cloud file storage management server 130 may be deployed within environment of a cloud service provider (e.g., where each of the cloud storage services 120 is provided by a single cloud service provider). Various other arrangements are contemplated.

Although the cloud file storage management server 130 is primarily depicted and described herein as a standalone element, it is noted that the various functions of cloud file storage management server 130 may be deployed in various other ways. In one embodiment, for example, various functions of the cloud file storage management server 130 may be distributed across multiple instances of the cloud file storage management server 130 (which may be deployed at any suitable location(s)). In one embodiment, for example, various functions of cloud file storage management server 130 may be disposed on existing equipment available for hosting such functions (e.g., of one or more of the customer environment 110, one or more environments of one or more cloud service providers, the communication network 140, and the like, as well as various combinations thereof). It is noted that combinations of such embodiments also are contemplated.

The operation of cloud file storage management server 130 may be better understood when presented within the context of a dual-service cloud storage model including two cloud storage services 120 (although, as depicted and descried with respect to FIG. 1, any suitable number of cloud storage services 120 may be considered when managing storage of file system 111 of the customer 110). Accordingly, for purposes of describing various embodiments of the cloud storage management capability, it is assumed that the dual-service cloud storage model includes a first cloud storage service $120_1$ (e.g., a relatively high storage cost and low-latency system, such as AMAZON ELASTICACHE, AMAZON EBS, and the like) and a second cloud storage service $120_2$ (e.g., a relatively low storage cost and high-latency system, such as AMAZON S3 and the like). These first and second cloud storage services $120_1$ and $120_2$ are referred to herein as Cache and Disk, respectively, and are depicted in more detail in FIG. 2.

Figure 2:
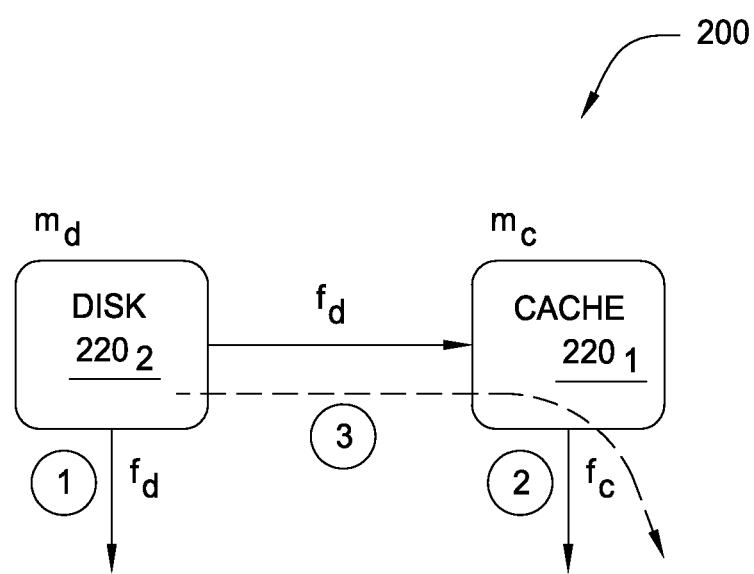
FIG. 2 depicts an exemplary dual-service cloud storage model including two of the cloud storage services of FIG. 1.

FIG. 2 depicts an exemplary dual-service cloud storage model including two of the cloud storage services of FIG. 1.

As depicted in FIG. 2, exemplary dual-service cloud storage model 200 includes a Cache $220_1$ and a Disk $220_2$. The Cache $220_1$ and Disk $220_2$ represent two of the cloud storage services 120 and, thus, are assumed to have respective storage volumes 121 associated therewith and available for storing data blocks of the files of the file system 111 of FIG. 1. Although omitted for purposes of clarity, it is assumed that the cloud file storage management system 130 is operating to provide various cloud storage management functions within the dual-service cloud storage model 200 of FIG. 2.

In general, the main expenses of running a file system are the access costs and storage costs. The cost of accessing a data block includes two components: (1) a per-block I/O access cost that is independent of the size of the data block, and (2) a bandwidth cost of transferring the data block, which depends on the size of the data block. These costs may be expressed using any suitable units. For example, the storage cost may be expressed in units of dollars per block per hour, the per-I/O access cost of moving data is expressed in dollars per access per block, and the bandwidth cost is expressed in dollars per block. The per-block I/O cost and the bandwidth cost may be combined into one access-cost parameter. It will be appreciated that these parameters will change when the data block size changes. The costs of storing data and accessing (fetching) data from the Disk $220_2$ (Cache $220_1$) are denoted as $m_d$ ($m_c$) and $f_d$ ($f_c$), respectively.

In one embodiment, cost optimizer 133 is configured to optimize the overall costs involved for storing and accessing X bytes of data in the dual-service cloud storage model 200 of FIG. 2.

In one embodiment, three questions are considered when addressing this problem: (1) where should data reside by default, (2) when should data move from Disk $220_2$ to Cache $220_1$ and vice versa, and (3) when should the size of the Cache $220_1$ be increased or decreased.

For the exemplary dual-service cloud storage model 200 of FIG. 2, it is noted that all data of the file system must, by default, reside in the Disk $220_2$, because the Disk $220_2$ has the lowest cost of storage among the two storage systems (i.e., $m_d < m_c$). In other word, all data of the file system is stored in the Disk $220_2$, because the data has to be stored in one of the two storage systems by default and, clearly, the low storage cost location (i.e., Disk $220_2$) minimizes this default storage cost.

For the exemplary dual-service cloud storage model 200 of FIG. 2, it is further noted that, from the Disk $220_2$, data can be accessed in one of three ways (denoted as data access mechanisms 201 in FIG. 2). In first data access mechanism $201_1$, data can be fetched directly from Disk $220_2$. In second data access mechanism $201_2$, data can be fetched from the Cache $220_1$ if it exists there. In third data access mechanism $201_3$ (which represents a typical caching model), data is fetched from Disk $220_2$ and stored in the Cache $220_1$, from where it is served henceforth until it is removed from the Cache $220_1$. If fd≤fc, then it does not make sense to keep any data in the Cache $220_1$, since the total costs are lowered by always accessing data from the Disk $220_2$; however, this is not common in practice since, typically, $f_c << f_d$ in cloud storage services. Given that $f_d > f_c$, and that future arrivals are not known, it may be desirable to store data in the Cache $220_1$ for some amount of time whenever that data is retrieved from the Disk $220_2$ to serve an access request. Thus, it makes sense to consider the third data access mechanism $201_3$ more carefully.

In third data access mechanism $201_3$, when a data block is requested, the data block is read from the Disk $220_2$ to the Cache $220_1$ and is then read from the Cache $220_1$ (e.g., to an associated VM), thereby incurring a cost of $f_d+f_c$. At this point the data block is in both the Disk $220_2$ and the Cache $220_1$, and may be removed from the Cache $220_1$ or maintained in the Cache $220_1$ for additional time. If the data block is kept in the Cache $220_1$ for additional time, if there is a request for the data block then the data block can be read from the Cache $220_1$ at a cost of $f_c$. It is noted, however, that during the additional time that the data block is in the Cache $220_1$, the storage cost rate is $m_c+m_d$. At any point in time, a data block can be evicted from Cache $220_1$, such that the data block is only in the Disk $220_2$ and the memory cost rate will be $m_d$. In one embodiment, data block movement control engine 134 is configured to implement a Cache eviction policy, for controlling eviction of data blocks from Cache $220_1$, which minimizes the overall operational cost of Cache $220_1$.

It is noted that various embodiments of data block storage control engine 133 and data block movement control engine 134 may be better understood when considering the various costs depicted and described with respect to the exemplary dual-service cloud storage model 200 of FIG. 2.

In one embodiment, as noted herein, data block storage control engine 133 is configured to perform a cost analysis and file storage control function (e.g., computing, for each data block, a storage location for the data block and the storage duration for which the data block is to remain in the storage location, unless probabilistically evicted from the storage location at an earlier time). The cost analysis and file storage control function may be better understood by considering operation of data block storage control engine 133 within the context of the dual-service cloud storage model 200 of FIG. 2.

In one embodiment, data block storage control engine 133 is configured to determine the cumulative storage and access cost for a data block when the access times for the data block are known in advance. When the data block is accessed, it is read from the Disk $220_2$ onto the Cache $220_1$. An assumption is made that the next access to the data block is after l time units. If after the current retrieval the data block is stored in the Cache $220_1$ for the next l time units, then the cumulative storage and access cost will be $(m_c+m_d)l+f_c$. If the current access of the data block is not stored in the Cache $220_1$ (and, instead, is left in the Disk $220_2$), then the cumulative storage and access cost for the next access of the data block will be $[m_d l+f_c+f_d]$. The optimal policy will depend on when the next access to the data block will occur. The data block storage control engine 133 determines that it is better to keep the data block in the Cache $220_1$ and to retrieve it from the Cache $220_1$ if $(m_c+m_d)l+f_c \le m_d(l)+f_c+f_d \Rightarrow l \le f_d/m_c$. The data block storage control engine 133 determines that, if $l > f_d/m_c$, it is more cost effective to discard the data block from the Cache $220_1$ and retrieve it from the Disk $220_2$. This crossover time is denoted as $T = f_d/m_c$. The optimum cumulative storage and access cost if the next access of the data block occurs after l time units is denoted as OPT(l) and, thus, from the above discussion, it follows that:

$$OPT(\ell) = \begin{cases} (m_c + m_d)\ell + f_c & \text{if } \ell \le T \\ m_d \ell + f_c + f_d & \text{if } \ell > T. \end{cases}$$

In one embodiment, as noted herein, data block movement control engine 134 is configured to provide an access pattern analysis and file movement function (e.g., analyzing the access patterns for data blocks of the file system and controlling storage of the data blocks in the cloud storage services (including movement of data blocks between storage volumes of cloud storage services) based on the analysis of the access patterns of the data blocks). The access pattern analysis and file movement function may be better understood by considering operation of data block movement control 134 within the context of the dual-service cloud storage model 200 of FIG. 2.

In one embodiment, data block movement control engine 134 is configured to provide a probabilistic eviction scheme for probabilistically evicting data blocks from Cache $220_1$. It is noted that, while a deterministic scheme will maintain a data block in the Cache $220_1$ for a certain amount of time from the last access of the data block (e.g., T time units) and then discard the data block, the expected cumulative storage and access cost of the deterministic scheme can be reduced by probabilistically evicting data blocks from Cache $220_1$ (using eviction probabilities) even before time T.

In one embodiment, for example, data block movement control engine 134 is configured to support probabilistic eviction of data blocks from Cache $220_1$ by: (a) when a data block is accessed (either from Disk $220_2$ or Cache $220_1$), computing a data block eviction time for the data block based on a probability density function p(t) that describes the probability of discarding a data block from the Cache $220_1$ at time t ∈ [0,T] from the last access time of the data block, and (2) evicting the data block from the Cache $220_1$ after the computed data block eviction time has elapsed with no subsequent access to the data block. It is noted that, where a data block is not probabilistically evicted from Cache $220_1$ prior to the storage deadline of the data block (e.g., as determined based on the storage duration of the data block computed by the cost analyzer engine 133), the data block still will be discarded from Cache $220_1$ at the storage deadline (i.e., in accordance with the storage duration).

In this embodiment, as noted above, the data block is guaranteed to be discarded from the Cache $220_1$ by time T from its last access time (whether it be prior to time T from its last access due to probabilistic eviction or at time T due to expiration of the storage duration). This implies that $\int_0^T p(t) dt=1$. Let E[PFS(l)] denote the expected cost of the probabilistic eviction scheme when the next access to the data block is after l time units. It is noted that the expectation is due to the uncertainty in when the data block will be discarded from the Cache $220_1$. Without making a probabilistic assumption about when the next access to the data block will occur, p(t) is selected in order to ensure that the expected competitive ratio (denoted as α, as shown below) is as small as possible:

$$\alpha = \max_{\ell} \frac{E[PFS](\ell)}{OPT(\ell)}.$$

The expected competitiveness ratio α of the probabilistic eviction scheme may be computed via a cost analysis of the probabilistic eviction scheme. For purposes of such a cost analysis, assume that a data block is accessed at time l, and discarded from the Cache $220_1$ at time t. The expected cumulative storage and access cost of the probabilistic eviction scheme E[PFS(l)] is given by:

$$\int_0^\ell [(m_d + m_c)t + f_c + f_d + m_d(\ell - t)] p(t) dt + \int_\ell^t [(m_d + m_c)\ell + f_c] p(t) dt.$$

In this equation, the first integral represents the expected cumulative storage and access cost if the data block is discarded at some time t before the retrieval time l. There is a disk and cache cost of $(m_c+m_d)t$ and a disk cost of $m_d(l-t)$ from the discard time t until access time l. In addition, there is a reading cost of $f_c+f_d$ for reading the data block from the Disk $220_2$ since the data block has been discarded from Cache $220_1$ before the access time l. In this equation, the second integral represents the expected cumulative storage and access cost when the access time l is before the discard time t. In this case, there is a memory cost of $(m_d+m_c)$l and the read cost from the Cache $220_1$. Each of these costs is weighted with the probability of discarding the data block from Cache $220_1$ at time t.

In one embodiment, an objective is to solve the following optimization problem (represented by Equations (1), (2), and (3), shown below).

$$\min \alpha \qquad (1)$$

$$E[PFS(l)] \leq \alpha OPT(l), \forall l \qquad (2)$$

$$\int_0^T p(t) dt = 1 \qquad (3)$$

In this case, differentiating Equation (2) with respect to l and simplifying, results in:

$$m_d \int_0^\ell p(t) dt + f_d p(\ell) + (m_d + m_c) \int_\ell^T p(t) dt \leq \frac{dOPT(\ell)}{d\ell}.$$

In this case, differentiating the preceding Equation again with respect to x results in:

$$f_d p'(\ell) - m_c p(\ell) \leq \frac{d^2 OPT(\ell)}{d\ell^2}.$$

It is noted that, from the definition of $$OPT(\ell), \frac{d^2 OPT(\ell)}{d\ell^2} = 0.$$

It is further noted that, at the optimal point, this constraint is tight and, hence, the inequality can be replaced by an equality sign. Additionally, recalling that $T=f_d/m_c$, the above differential equation may be rewritten as:

$$p'(t) - \frac{1}{T} p(t) = 0.$$

It is then possible to solve for p(t) in order to obtain $p(t)=Ke^{t/T}$. Then, using Equation (3), it is possible to solve for K, which results in $$K = \frac{1}{T(e-1)}.$$

As a result, it is determined that the optimal probability distribution is $$p(t) = \frac{1}{T(e-1)} e^{t/T}.$$

Then, substituting this optimal probability distribution into Equation (2) and solving for expected competitiveness ratio α gives an optimum expected competitiveness ratio α of:

$$\alpha = 1 + \frac{1}{e-1} \left( \frac{f_d}{m_d + f_d + f_c} \right) \leq 1 + \frac{1}{e-1} < 1.582.$$

Therefore, the probabilistic eviction scheme has an expected competitiveness ratio of approximately 1.582.

In one embodiment, data block movement control engine 134 is configured to compute a data block eviction time for a data block when the data block enters the Cache $220_1$ or when the data block is accessed while in the Cache $220_1$. The data block movement control engine 134 is configured to calculate the data block eviction time as follows: (1) compute $T=f_d/m_c$ for the data block, (2) generate U, which is a uniformly distributed random variable in the range [0:1], and (3) compute the data block eviction time from the current time as T log [(e−1)U+1]. In one embodiment, in which the Cache $220_1$ is examined only periodically, the eviction time is rounded to the closest time at which the Cache $220_1$ is examined. It is noted that, while this rounding can affect the performance ratio if the rounding intervals are very long, this effect is negligible in most cases.

In one embodiment, as noted herein, storage volume resize engine 135 is configured to perform a storage volume resize function (e.g., determining when and how to adjust the storage volume sizes of the storage volumes 121 of cloud storage services 120). The storage volume resize function may be better understood by considering operation of storage volume resize engine 135 within the context of the dual-service cloud storage model 200 of FIG. 2. In this exemplary embodiment, the storage volume resize function is adapted to provide volume resizing for Cache $220_1$ (denoted as Cache volume resizing for this embodiment).

In many cases, the ideal cache volume size for the Cache $220_1$ is the minimum cache volume size needed to host the working set of files from the file system. Ideally, no data blocks should be evicted from the Cache $220_1$ (e.g., via LRU) due to lack of available space in the Cache $220_1$, but, rather, only due to cost constraints. As the working set of files of the file system changes, the cache volume size of Cache $220_1$ may be adjusted accordingly.

In one embodiment, resizing of the cache volume size of the Cache $220_1$ is performed in periodic Cache volume resizing intervals.

In one embodiment, resizing of the cache volume size of the Cache $220_1$ is performed as follows. The cache volume size of the Cache $220_1$ at the moment of resizing is denoted as S. In a given interval between two Cache volume resizing events, the disk volume resize engine 135 monitors the Cache $220_1$ to determine the number of data blocks that are replaced in S before their eviction time (e.g., due to LRU), with the total number of replaced data blocks being denoted as $B_{replace}$. This indicates the level of inadequacy of the current cache volume size of the Cache $220_1$. In the same given interval between two Cache volume resizing events, the storage volume resize engine 135 monitors the Cache $220_1$ to determine the number of data blocks that have been evicted by data block movement control engine 134 (denoted as $B_{evict}$). This indicates the cache volume size of the Cache $220_1$ that is no longer needed to hold the data blocks. In this embodiment, at the next Cache volume resizing event, the storage volume resize engine 135 sets the cache volume size of the Cache $220_1$ to be $S+B_{replace}-B_{evict}$. It is noted that this embodiment assumes that the Cache $220_1$ can be expanded and contracted at any time instant. In some cases, however, there may be restrictions on how often (i.e., storage volume resizing intervals which, in the embodiment of FIG. 2, are referred to as cache resizing intervals) and/or by how much (i.e., storage volume resizing granularity which, in the embodiment of FIG. 2, is referred to as cache resizing granularity) the cache volume size of the Cache $220_1$ can be resized.

The cache resizing interval for Cache $220_1$ may be determined in a number of ways.

In one embodiment, cache resizing intervals are set such that a first cache resizing interval is used for attempts to increase the cache volume size of the Cache $220_1$ and a second cache resizing interval is used for attempts to decrease the cache volume size of the Cache $220_1$.

In one embodiment, the first cache resizing interval is smaller than the second cache resizing interval, such that attempts to increase the cache volume size of the Cache $220_1$ are performed more frequently than attempts to decrease the cache volume size of the Cache $220_1$.

In one embodiment, the size of the second cache resizing interval may be selected based on the pricing policy of the cloud storage service. For example, a particular cloud storage service of a cloud service provider may allow a storage volume to be allocated (e.g., attached to a VM) at any point in time and, once allocated, the user is required to pay for use of the storage volume for X length of time (e.g., 1 hour, 2 hours, and the like). In this case, it would be a waste of resources to deallocate the storage volume before the end of the length of time for which the user is being charged for the storage volume. In one such embodiment, the size of the second cache resizing interval may be set to be the smallest length of time for which a user may pay for use of a storage volume of the Cache $220_1$ (or a time slightly less than that). It is noted that having a larger time period for decreasing the cache volume size avoids frequent fluctuations in the cache volume size, thus making the cache volume size more stable.

From the foregoing embodiments, it will be appreciated that the first and second cache resizing intervals may be set to any suitable values (e.g., 2 minutes for the first cache resizing interval and 30 minutes for the second cache resizing interval, 4 minutes for the first cache resizing interval and 1 hour for the second cache resizing interval, 30 minutes for the first cache resizing interval and 6 hours for the second cache resizing interval, and the like), which may depend at least in part on characteristics of the cloud storage service (e.g., in this embodiment, characteristics of the Cache $220_1$). It is further noted that allocating or deallocating a storage volume involves moving data blocks around, which can cause significant overhead if done frequently.

The cache resizing granularity for Cache $220_1$ may be determined in a number of ways. In many cases, there are practical restrictions on the granularity of increasing or decreasing the cache volume size. In at least some cloud storage services, for example, the minimum increment/decrement size for the Cache $220_1$ may be 1 GB (although it will be appreciated that any other granularity may be used). If $B_{replace} \geq B_{evict}$ then $B_{replace}-B_{evict}$ represents the amount by which the cache volume size is to be increased. If $B_{replace} < B_{evict}$ then $B_{replace}-B_{evict}$ represents the amount by which the cache volume size is to be decreased. In one embodiment, based on the granularity restrictions, the determined cache resizing amount is rounded (up or down, as appropriate) to the nearest multiple of the minimum increment/decrement size for the storage volume.

In one embodiment, separate read and write storage volumes may be allocated within a specific cloud storage service (e.g., within Cache $220_1$ or Disk $220_2$). In one embodiment, in which the cloud storage service charges differently for reads and writes, the replacement thresholds for a data block opened for a read or a write may be different. In one embodiment, for example, the replacement threshold for a data block opened for a write is longer than the replacement threshold for a data block opened for a read (e.g., twice as long, five times longer, ten times longer, or any other suitable amount). In the case of the AMAZON S3 service, for example, given the differential pricing for PUTs and GETs, a data block opened for write may be assigned a replacement threshold that is ten times longer than that of a data block opened for a read.

In such embodiments, the data block sizes to be used for the storage volumes may be set to any suitable values. The data block sizes may be controlled by the cloud storage services and/or the customer. It is noted, however, that selection of a data block size may be performed while taking into account the following tradeoff: large data blocks reduce the I/O cost due to coalescing of writes but increase the storage cost in at least some types of cloud storage services (e.g., Cache $220_1$), and vice versa. In one embodiment, discrepancies between block sizes associated with different cloud storage services (e.g., Cache $220_1$ and Disk $220_2$) may be handled as follows:

(a) when a read of Disk $220_2$ is issued by Cache $220_1$, a range read is used to read only the relevant data blocks (of the data block size supported by the Cache $220_1$), and (b) when a dirty data block is evicted from the Cache $220_1$, all data blocks (of the data block size supported by the Cache $220_1$) that are dirty in the data block evicted from the Cache $220_1$ and written back to the Disk $220_2$.

FIG. 3 depicts exemplary pseudocode for a read operation in the duel-service cloud storage model of FIG. 2. As depicted in FIG. 3, exemplary pseudocode 300 includes for functions $310_1$-$310_4$ (collectively, functions 310). The first function $310_1$ (Initialize function) is called the system start time, and initializes a number of variables used by other functions 310 (e.g., cache size, $B_{replace}$, $B_{evict}$, T, and the like). The second function $310_2$ (Access_Block function) is called to answer each read request from the application for which the file system is stored. The third function $310_3$ (Volume_Resize function) is called periodically in order to resize the Cache $220_1$. The fourth function $310_4$ (Compute_Eviction_Time function) is called to compute the eviction time of a data block upon accessing of the data block. The operation of exemplary pseudocode 300 of FIG. 3 may be better understood when considered in conjunction with the duel-service storage model 200 of FIG. 2. Although omitted for purposes of clarity, it is noted that pseudocode for a write operation is similar, and includes additional instructions to track dirty blocks, write back dirty blocks upon eviction, and perform periodic checkpointing of dirty blocks.

As described hereinabove, Cache $220_1$ and Disk $220_2$ are intended to represent exemplary cloud storage services (e.g., examples of two of the cloud storage services 120 of FIG. 1). Accordingly, references herein to "cache" and "disk" may be read more generally as references to first and second cloud storage services, respectively, and, similarly, embodiments depicted and described herein within the context of the dual-service cloud storage model 200 of FIG. 2 may be read considered to represent examples of more general embodiments applicable to the more general cloud storage services 120 of FIG. 1. It is noted that at least some such more general embodiments are depicted and described with respect to FIG. 4.

Although primarily depicted and described herein with respect to use of two hierarchical layers of cloud storage services 120 to store data blocks of the files of the file system 111 (namely, Disk and Cache), it will be appreciated that more than two hierarchical layers of cloud storage services cloud storage services may be used to store data blocks of the files of the file system 111. Similarly, although primarily depicted and described herein with respect to use of two cloud storage services 120 to store data blocks of the files of the file system 111, it will be appreciated that more than two cloud storage services 120 may be used to store data blocks of the files of the file system 111. In other words, any suitable number of cloud storage services 120, associated with any suitable number of hierarchical layers of cloud storage services 120, may be used to store the data blocks of the files of the file system 111.

Figure 4:
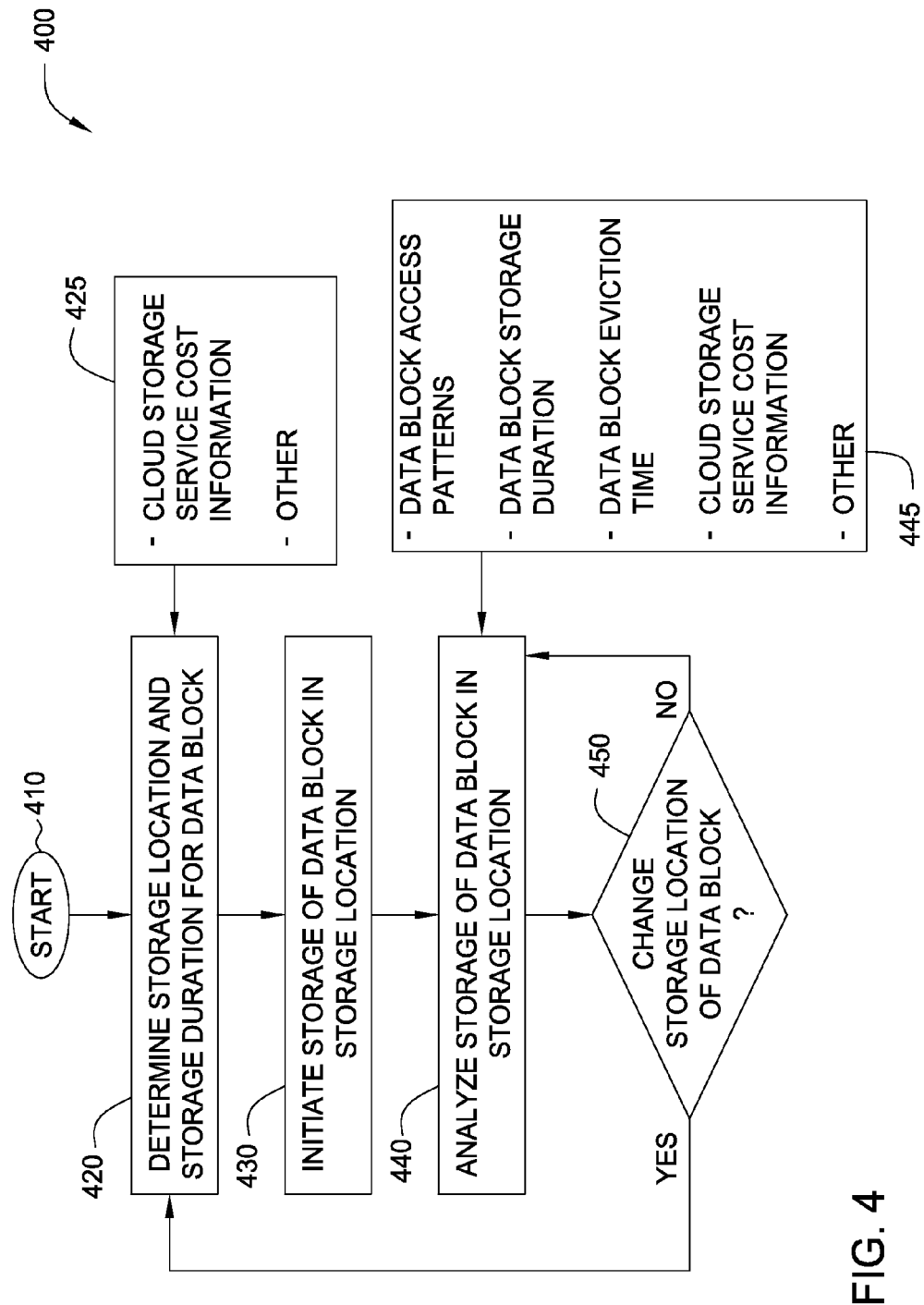
FIG. 4 depicts one embodiment of a method for managing storage of a data block in a cloud storage system including multiple cloud storage services.

FIG. 4 depicts one embodiment of a method for managing storage of a data block in a cloud storage system including multiple cloud storage services. Although depicted and described herein as being performed serially, it is noted that at least a portion of the steps of method 400 may be performed contemporaneously and/or in a different order than presented in FIG. 4.

At step 410, method 400 begins.

At step 420, storage information for a data block is determined. The storage information includes a storage location for the data block and a storage duration for a data block are determined. As indicated by box 425, the storage location and storage duration may be determined using cloud storage service cost information and, optionally, other relevant information. The cloud storage service cost information includes various types of costs related to multiple cloud storage services available for selection as the storage location for the data block (e.g., storage costs, I/O costs, bandwidth costs, and the like as well as various combinations thereof).

At step 430, storage of the data block in the storage location is initiated. The storage of the data block in the storage location may be completed in any suitable manner.

At step 440, storage of the data block in the storage location is analyzed for determining whether or not to change the storage location of the data block. As indicated by box 445, analysis of the storage of the data block is performed using one or more of the access patterns for the data block (e.g., numbers of access requests for the data block, the types of access requests for the data block, the times of the access requests for the data block, and the like, as well as various combinations thereof), a storage deadline computed for the data block (e.g., based on the storage duration), a data block eviction time computed for the data block, cloud storage service cost information, and, optionally, other relevant information. The analysis of the storage of the data block may include determining whether the data block is to be removed from the storage location due to expiration of the storage deadline, determining whether the data block is to be probabilistically evicted from the storage location, and the like.

At step 450, a determination is made as to whether to change the storage location of the data block. As noted above, the determination as to whether to change the storage location of the data block is dependent upon the analysis of the storage of the data block in the storage location. If a determination is made not to change the storage location of the data block, method 400 returns to step 440 (i.e., analysis of the storage of the data block continues in order to determine if/when the data block is to be moved to a new storage location). If a determination is made to change the storage location of the data block, method 400 returns to step 420, at which point a new storage location and new storage duration are determined for the data block.

It is noted that method 400 of FIG. 4 may continue to be executed for as long as the data block is maintained within the cloud.

It is further noted that method 400 FIG. 4 may be performed for each of the data blocks of the file system of the customer.

Figure 5:
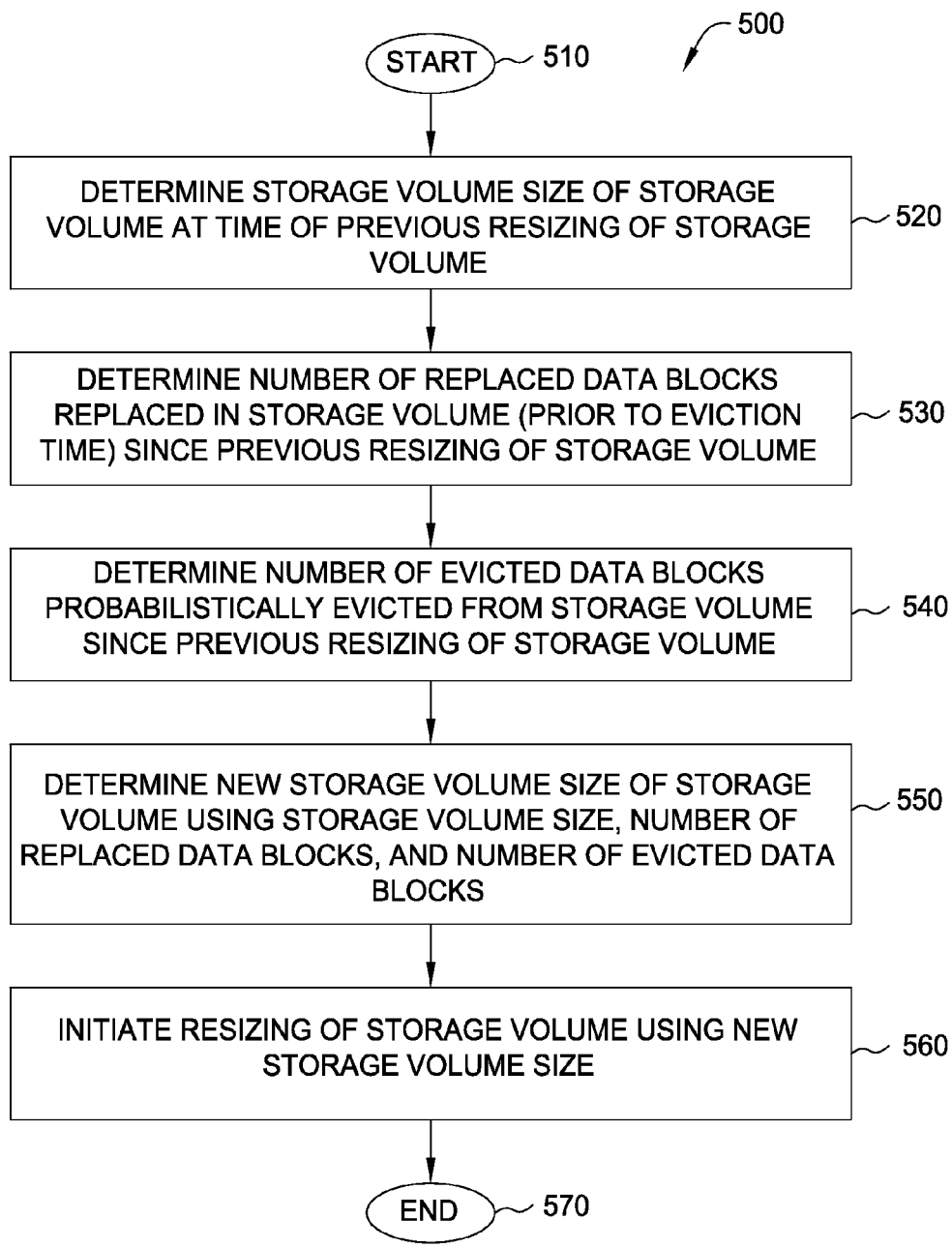
FIG. 5 depicts one embodiment of a method for resizing a storage volume of one of the cloud storage services of FIG. 1.

FIG. 5 depicts one embodiment of a method for resizing a storage volume of one of the cloud storage services of FIG. 1. Although depicted and described herein as being performed serially, it is noted that at least a portion of the steps of method 500 may be performed contemporaneously and/or in a different order than presented in FIG. 5. Although omitted for purposes of clarity, it is noted that method 500 of FIG. 5 may be executed periodically and/or in response to any suitable condition.

At step 510, method 500 begins.

At step 520, the storage volume size of the storage volume at the time of the previous resizing of the storage volume is determined. In other words, this represents the current storage volume size of the storage volume. As noted hereinabove, the storage volume size may be denoted as S.

At step 530, the number of replaced data blocks replaced in the storage volume (data blocks replaced prior to their associated eviction times, respectively) since the previous resizing of the storage volume is determined. In one embodiment, the number of replaced data blocks is determined by monitoring for and counting the number of replaced data blocks replaced in the storage volume since the previous resizing of the storage volume. In one embodiment, the number of replaced data blocks is determined by retrieving the value from memory (e.g., where a separate process is responsible for monitoring for and counting the number of replaced data blocks). As noted hereinabove, the number of replaced data blocks may be denoted as $B_{replace}$.

At step 540, the number of evicted data blocks probabilistically evicted from the storage volume since the previous resizing of the storage volume is determined. In one embodiment, the number of evicted data blocks is determined by monitoring for accounting the number of evicts data blocks evicted from the storage volume since the previous resizing of the storage volume. In one embodiment, the number of evicted data blocks is determined by retrieving the value from memory (e.g., where a separate process is responsible for monitoring for and counting the number of evicted data blocks). As noted hereinabove, the number of evicted data blocks may be denoted as $B_{evict}$.

At step 550, a new storage volume size of the storage volume is determined using the current storage volume size, the number of replaced data blocks, and the number of evicted data blocks. In one embodiment, for example, the new storage volume size is computed as $S+B_{replace}-B_{evict}$. In one embodiment, the computed value of the new storage volume size may be rounded to the nearest multiple of the resizing granularity supported by the cloud storage service of the storage volume.

At step 560, resizing of storage volume using the new storage volume size is initiated.

At step 570, method 500 ends.

Although primarily depicted and described herein with respect to use of the probabilistic eviction scheme to evict data blocks of a file system from the storage volumes of cloud storage services, it is noted that the probabilistic eviction scheme may be used to evict data blocks representing various other types of information and/or to evict data blocks from various other types of memories. More generally, various embodiments of the probabilistic eviction scheme may be used to evict any suitable types of data blocks from any suitable types of memories. An exemplary embodiment supporting a more general implementation of the probabilistic eviction scheme is depicted and described with respect to FIG. 6.

Figure 6:
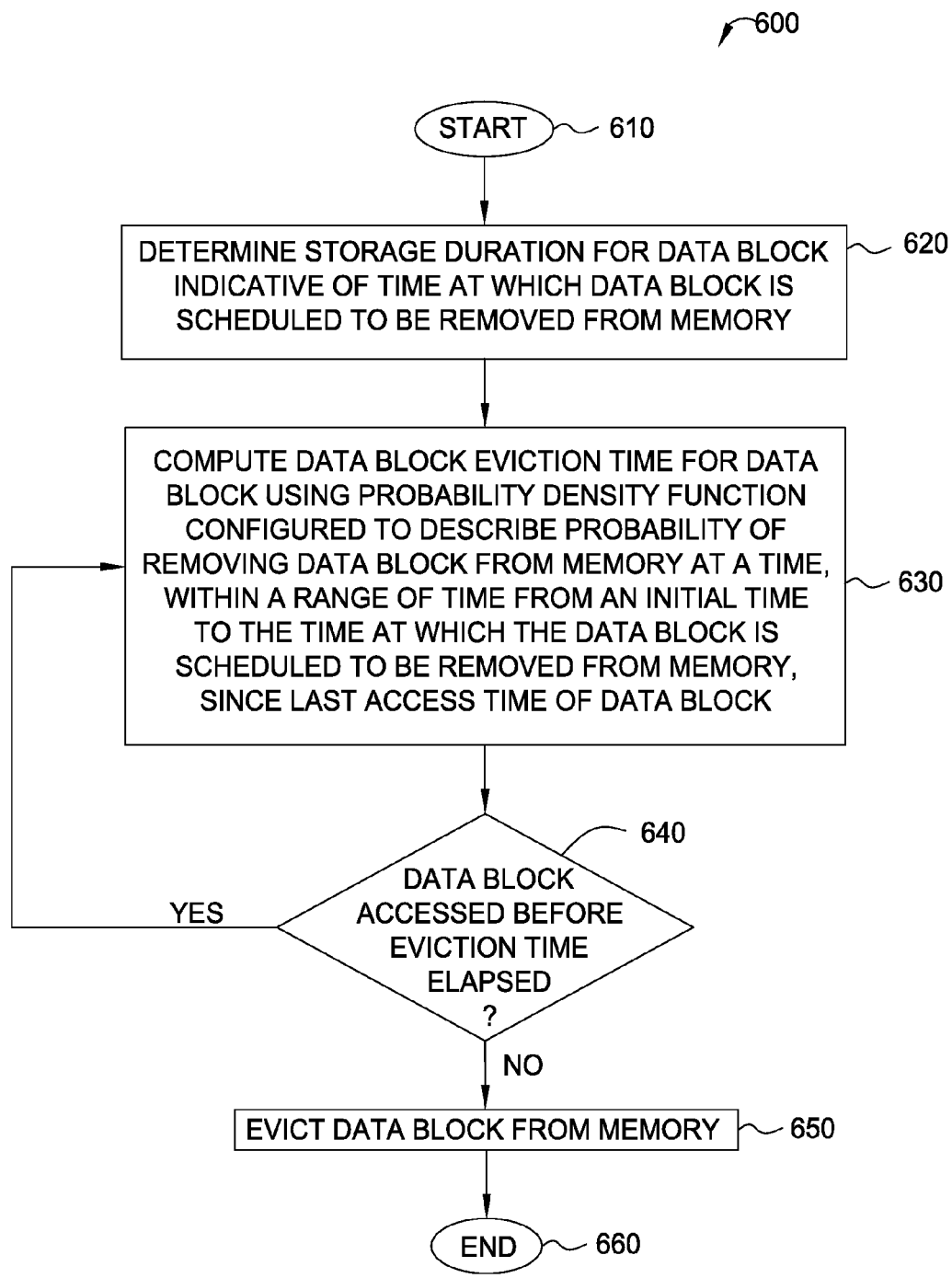
FIG. 6 depicts one embodiment of a method for determining whether to probabilistically evict a data block from a memory.

FIG. 6 depicts one embodiment of a method for determining whether to probabilistically evict a data block from a memory.

At step 610, method 600 begins.

At step 620, a storage duration is determined for the data block. The storage duration is indicative of a length of time for which the data block is to be stored in the memory (if not evicted earlier). Thus, the storage duration may be used to determine a time at which the data block is scheduled to be removed from the memory (e.g., current time plus the storage duration).

At step 630, a data block eviction time is computed for the data block. The data block eviction time is computed using a probability density function. The probability density function is configured to describe a probability of removing the data block from the memory at a time since a last access time of the data block, where the time since a last access time of the data block is within a range of time from an initial time to the time at which the data block is scheduled to be removed from the memory. The initial time may be the current time at which the data block eviction time is calculated, or any other suitable time. As noted above, the time at which the data block is scheduled to be removed from the memory may be determined from the storage duration (e.g., the time at which the storage duration is determined+the storage duration).

At step 640, a determination is made as to whether the data block is accessed before the data block eviction time has elapsed. If the data block is accessed before the data block eviction time has elapsed, method 600 returns to step 630 (i.e., another data block eviction time is computed for the data block). If the data block is not accessed before the eviction time has elapsed, method 600 proceeds to step 650. It is noted that this determination may be made by monitoring access patterns of the data block and monitoring whether the data block eviction time has elapsed.

At step 650, the data block is evicted from the memory. It is noted that, following the eviction, the data block may be moved to a different memory for storage.

At step 660, method 600 ends.

It is noted that the probabilistic eviction scheme of method 600 may be used to evict data blocks from any suitable type of memory.

In one embodiment, for example, as depicted and described with respect to FIGS. 1-5, the probabilistic eviction scheme of method 600 may be used to evict data blocks from a memory hosting a storage volume of a cloud storage service.

In one embodiment, for example, the probabilistic eviction scheme of method 600 may be used to evict data blocks from a memory of an end user computer (e.g., a desktop computer, a laptop computer, a tablet computer, a smartphone, and the like).

It is noted that such embodiments may be used to control storage of data so that the data is consolidated in a subset of the available storage modules and, thus, any storage module not needed at the time may be powered off until needed. In one embodiment, for example, in a computer having multiple RAM chips where each of the RAM chips is individually controllable for being turned on/off under control of an operating system of the computer, the operating system may determine the workload of the computer (e.g., actual and/or expected), determine a quantity of RAM needed by the computer to handle the workload of the computer, and then switch one or more RAM chips on and off as needed to meet the workload of the computer. In one embodiment, for example, in a computer system attached to multiple hard disks where each of the hard disks is individually controllable for being turned on/off under control of the computer system, the computer system may determine its own workload (e.g., actual and/or expected), determine a quantity of hard disks space needed by the computer system to handle its workload, and then switch one or more hard disks on and off as needed to meet the workload of the computer system. It is noted that these functions may be used in various other types of environments in order to individually control storage modules for turning the storage modules on and off as needed/desired.

In this manner, the probabilistic eviction scheme of method 600 may be used to provide energy savings for computers and systems using multiple storage modules. Namely, when multiple storage modules are available for storing data blocks, the probabilistic eviction scheme of method 600 may be used to facilitate eviction of data blocks from one or more of the available storage modules such that the data is consolidated in a subset of the available storage modules and any of the available storage modules not being used can be switched off so that the energy typically used to power the storage module(s) is conserved.

Figure 7:
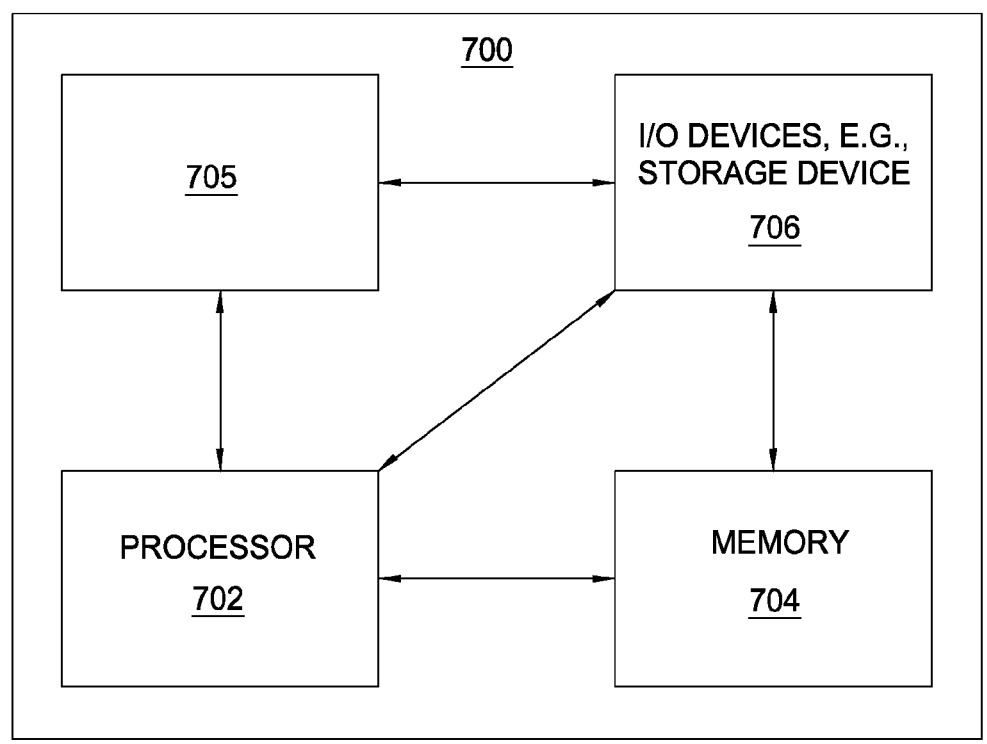
FIG. 7 depicts a high-level block diagram of a computer suitable for use in performing functions described herein.

FIG. 7 depicts a high-level block diagram of a computer suitable for use in performing functions described herein.

As depicted in FIG. 7, computer 700 includes a processor element 702 (e.g., a central processing unit (CPU) and/or other suitable processor(s)) and a memory 704 (e.g., random access memory (RAM), read only memory (ROM), and the like). The computer 700 also may include a cooperating module/process 705 and/or various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or may be implemented in hardware (e.g., using a general purpose computer, one or more application specific integrated circuits (ASIC), and/or any other hardware equivalents).

It will be appreciated that the functions depicted and described herein may be implemented in software (e.g., for executing on a general purpose computer (e.g., via execution by one or more processors) so as to implement a special purpose computer) and/or may be implemented in hardware (e.g., using one or more application specific integrated circuits (ASIC) and/or one or more other hardware equivalents).

In one embodiment, the cooperating process 705 can be loaded into memory 704 and executed by the processor 702 to implement functions as discussed herein. Thus, cooperating process 705 (including associated data structures) can be stored on a computer readable storage medium, e.g., RAM memory, magnetic or optical drive or diskette, and the like.

It will be appreciated that computer 700 depicted in FIG. 7 provides a general architecture and functionality suitable for implementing functional elements described herein and/or portions of functional elements described herein. For example, the computer 700 provides a general architecture and functionality suitable for implementing one or more of one or more devices of customer environment 110, one or more devices (e.g., networking devices, aggregator switches, top-of-rack switches, hypervisors, blade servers, blades, processors, and the like) used to provide one or more of the cloud storage services 120, cloud file storage management server 130, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor configured to:
determine a storage duration for storage of a data block in a memory, the storage duration configured to indicate a time at which the data block is scheduled to be removed from the memory;
compute a data block eviction time for the data block based on a probability density function configured to describe a probability of removing the data block from the memory at a time, within a range of time from an initial time to the time at which the data block is scheduled to be removed from the memory, since a last access time of the data block; and
evict the data block from the memory when the data block eviction time elapses without a subsequent access to the data block.

2. The apparatus of claim 1, wherein the processor is configured to:
compute the data block eviction time when the data block is stored in the memory or accessed from the memory.

3. The apparatus of claim 1, wherein the processor is configured to compute the probability density function as:

$$p(t) = \frac{1}{T(e-1)} e^{t/T},$$

wherein T is the storage duration for the data block and t is the time since the last access time of the data block.

4. The apparatus of claim 1, wherein, to compute the data block eviction time, the processor is configured to:
generate a uniformly distributed random variable U in the range [0:1]; and
compute the data block eviction time from a current time as T log [(e−1)U+1], wherein T is the storage duration for the data block.

5. The apparatus of claim 1, wherein the processor is configured to determine the storage duration for the data block by computing the storage duration for the data block using cost information associated with each of a plurality of memories available for storing the data block.

6. The apparatus of claim 1, wherein the memory is configured to host a storage volume of a cloud storage service.

7. The apparatus of claim 1, wherein the memory is a memory of an end user computer.

8. A method, comprising:
determining, by a processor, a storage duration for storage of a data block in a memory, the storage duration configured to indicate a time at which the data block is scheduled to be removed from the memory;
computing a data block eviction time for the data block based on a probability density function configured to describe a probability of removing the data block from the memory at a time, within a range of time from an initial time to the time at which the data block is scheduled to be removed from the memory, since a last access time of the data block; and
evicting the data block from the memory when the data block eviction time elapses without a subsequent access to the data block.

9. The method of claim 8, wherein the data block eviction time is computed when the data block is stored in the memory or accessed from the memory.

10. The method of claim 8, further comprising:
computing the probability density function as:

$$p(t) = \frac{1}{T(e-1)} e^{t/T},$$

wherein T is the storage duration for the data block and t is the time since the last access time of the data block.

11. The method of claim 8, wherein computing the data block eviction time comprises:
generating a uniformly distributed random variable U in the range [0:1]; and
computing the data block eviction time from a current time as T log [(e−1)U+1], wherein T is the storage duration for the data block.

12. The method of claim 8, wherein determining the storage duration for the data block comprises:
computing the storage duration for the data block using cost information associated with each of a plurality of memories available for storing the data block.

13. The method of claim 8, wherein the memory is configured to host a storage volume of a cloud storage service.

14. The method of claim 8, wherein the memory is a memory of an end user computer.

15. A non-transitory computer-readable storage medium storing instructions which, when executed by a computer, cause the computer to perform a method, the method comprising:
determining a storage duration for storage of a data block in a memory, the storage duration configured to indicate a time at which the data block is scheduled to be removed from the memory;
computing a data block eviction time for the data block based on a probability density function configured to describe a probability of removing the data block from the memory at a time, within a range of time from an initial time to the time at which the data block is scheduled to be removed from the memory, since a last access time of the data block; and
evicting the data block from the memory when the data block eviction time elapses without a subsequent access to the data block.

16. The non-transitory computer-readable storage medium of claim 15, wherein the data block eviction time is computed when the data block is stored in the memory or accessed from the memory.

17. The non-transitory computer-readable storage medium of claim 15, the method further comprising:
computing the probability density function as:

$$p(t) = \frac{1}{T(e-1)} e^{t/T},$$

wherein T is the storage duration for the data block and t is the time since the last access time of the data block.

18. The non-transitory computer-readable storage medium of claim 15, wherein computing the data block eviction time comprises:
generating a uniformly distributed random variable U in the range [0:1]; and
computing the data block eviction time from a current time as T log [(e−1)U+1], wherein T is the storage duration for the data block.

19. The non-transitory computer-readable storage medium of claim 15, wherein determining the storage duration for the data block comprises:
computing the storage duration for the data block using cost information associated with each of a plurality of memories available for storing the data block.

20. The non-transitory computer-readable storage medium of claim 15, wherein the memory is configured to host a storage volume of a cloud storage service.

21. The non-transitory computer-readable storage medium of claim 15, wherein the memory is a memory of an end user computer.

* * * * *